United States Patent
Eriksson

(10) Patent No.: US 9,144,087 B2
(45) Date of Patent: Sep. 22, 2015

(54) METHOD AND ARRANGEMENT FOR HANDLING A SCHEDULING REQUEST

(75) Inventor: Erik Eriksson, Linköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 99 days.

(21) Appl. No.: 13/383,975

(22) PCT Filed: Oct. 7, 2011

(86) PCT No.: PCT/SE2011/051209
§ 371 (c)(1),
(2), (4) Date: Jun. 18, 2012

(87) PCT Pub. No.: WO2013/025139
PCT Pub. Date: Feb. 21, 2013

(65) Prior Publication Data
US 2013/0044699 A1    Feb. 21, 2013

Related U.S. Application Data

(60) Provisional application No. 61/523,452, filed on Aug. 15, 2011.

(51) Int. Cl.
*H04W 72/12* (2009.01)

(52) U.S. Cl.
CPC ...... *H04W 72/1289* (2013.01); *H04W 72/1268* (2013.01)

(58) Field of Classification Search
CPC ............................................... H04W 72/1289
See application file for complete search history.

(56) References Cited

U.S. PATENT DOCUMENTS

| 9,078,279 | B2 | 7/2015 | Chandra et al. | |
|---|---|---|---|---|
| 2006/0146874 | A1 | 7/2006 | Yuan et al. | |
| 2007/0291719 | A1* | 12/2007 | Demirhan et al. | 370/338 |

(Continued)

FOREIGN PATENT DOCUMENTS

| RU | 2384983 C2 | 3/2010 |
|---|---|---|
| WO | 2011/038780 A1 | 4/2011 |
| WO | 2011/063244 A2 | 5/2011 |

OTHER PUBLICATIONS

International Search Report in corresponding International Application No. PCT/SE2011/051209 mailed Apr. 5, 2012.

(Continued)

*Primary Examiner* — Jason Mattis
(74) *Attorney, Agent, or Firm* — Patent Portfolio Builders PLLC

(57) ABSTRACT

A method in a user equipment for handling a scheduling request, SR, is provided. The user equipment is served by a base station in a cellular communications network. The user equipment receives a first message from the base station. The first message comprises a first assignment of SR resources. The first message is received using a first protocol. The first assignment of SR resources is semi-static. The user equipment further receives a second message from the base station. The second message comprising a second assignment of SR resources. The second message is received using a second protocol. The second protocol is associated with a layer that is lower than a layer associated with the first protocol. The user equipment then applies the SR resources according to the first assignment and the SR resources according to the second assignment at the same time or separately.

16 Claims, 6 Drawing Sheets

(56) References Cited

U.S. PATENT DOCUMENTS

2008/0137618 A1\* 6/2008 Sung et al. .................. 370/336
2008/0225783 A1 9/2008 Wang et al.
2009/0046639 A1\* 2/2009 Cai et al. ..................... 370/329
2010/0070814 A1\* 3/2010 Damnjanovic et al. ....... 714/748
2011/0081932 A1\* 4/2011 Astely et al. .................. 455/509
2013/0072208 A1\* 3/2013 Marinier et al. ............... 455/450

OTHER PUBLICATIONS

Written Opinion of the International Searching Authority in corresponding International Application No. PCT/SE2011/051209 mailed Apr. 5, 2012.

Decision on Grant in related Russian Patent Application No. 2014109742, dated Aug. 5, 2015.

\* cited by examiner

METHOD AND ARRANGEMENT FOR HANDLING A SCHEDULING REQUEST

TECHNICAL FIELD

Embodiments herein relate to a user equipment, a base station, and methods therein. In particular, it relates to handling a scheduling request, SR.

BACKGROUND

Communication devices such as User Equipments (UE) are also known as e.g. mobile terminals, wireless terminals and/or mobile stations. User equipments are enabled to communicate wirelessly in a cellular communications network or wireless communication system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, the expression Downlink (DL) is used for the transmission path from the base station to the mobile station. The expression Uplink (UL) is used for the transmission path in the opposite direction i.e. from the mobile station to the base station.

3GPP LTE radio access standard has been written in order to support high bitrates and low latency both for uplink and downlink traffic. All data transmission is in LTE controlled by the radio base station. In order to support efficient uplink scheduling, a method has been defined to inform the base station of the buffer status of the UE. This method mainly comprises of buffer status reports (BSR) and scheduling request (SR). Both the BSR and the SR are sent from the UE to the base station. The UE triggers a BSR, this in turn trigger a SR to be sent unless a valid uplink data transmission resource is available, the base station receives the SR and give the UE a uplink data transmission resource, the UE then sends the BSR to the base station. A number of rules have been defined on when a UE should trigger a BSR, such as arrival of new data to an empty buffer. The BSR is sent on the physical uplink shared channel (PUSCH) like other data transmissions. Since a BSR transmission requires a valid uplink resource, SR has been defined as single bit information indicating to the base station that a BSR has been triggered in the UE. This may be performed by 1) a BSR is triggered in the UE, then 2) a SR message indicating that the BSR has been triggered is sent by the UE to the base station, and 3) then the triggered BSR is sent by the UE to the base station. The SR message is sent to the base station to request resources for the BSR. However, the base station may select to give a resource larger than just containing the BSR. The SR message may be transmitted either on a preconfigured semi-static configured periodic resource on the Physical Uplink Control Channel (PUCCH), referred to as Dedicated Scheduling Request (D-SR). It means that the base station may configure a resource, e.g. may send a message comprising index, periodicity and time offset, that shall be valid until a further notice is sent to the user equipment. There are some release rules, to release assigned recourses but in principle the UE keep the resource. If no such resource has been configured or configured resources have been released, SR is transmitted on the Random Access Channel (RACH). This SR may be referred to as Random Access Scheduling Request (RA-SR). The expression configured means here that the UE has a D-SR resource, configured over Radio Resource Control (RRC) and which is not released according to the release rules. The D-SR resource on the PUCCH uses a code division multiple access scheme to uniquely identify the user on a specific time/frequency resource. On each LTE uplink resource block pair, up to 36 unique code resources is available. A resource block pair is a 3GPP specific resource definition, it comprises two 0.5 ms/180 kHz time frequency blocks consecutive in time. On PUCCH they are not on the same frequency but frequency hopping is used so the first resource block is on one band-edge and the other is on the other band edge. It is up to the LTE base station, i.e. the eNodeB, to define the total size of the PUCCH and to divide the resources in time, frequency and code to each user, where the trade-off stands between short periodicities giving low latency but costing in larger overhead for control channels versus lower overhead but with longer delay. Typically an eNodeB may assign different UEs different periodicities dependent on service. D-SR resources are assigned, i.e. configured semi-statically using RRC signalling. The term semi-statically means that the UE has a D-SR resource, configured over RRC and not released according to the release rules. The RRC protocol is used in LTE/Evolved Universal Terrestrial Radio Access Network (E-UTRAN), and in Wideband Code Division Multiple Access (WCDMA) and handles the control plane signalling of Layer 3 between the UEs and the Universal Terrestrial Radio Access Network (UTRAN) or E-UTRAN. UTRAN is a collective term for the Node B's and Radio Network Controllers which make up the UMTS radio access network. RRC signalling is protected by both Hybrid Automatic Repeat reQuest (HARQ) and Radio Link Control (RLC) retransmission protocols, to be robust to packet loss in order to ensure that the same understanding of the configuration is valid in both the eNB and the UE. I.e all parameters set in the RRC message, for example the D-SR resource that this user equipment shall use.

The problem with the existing solution is that the UE need for D-SR resources may shift over time but the reconfiguration mechanism used, i.e. the procedure to send a further RRC message with a new configuration, is to slow and costly in terms of overhead in order to follow the variations.

SUMMARY

It is therefore an object of embodiments herein to provide a way of improving the efficiency of handling SR resources.

According to a first aspect of embodiments herein, the object is achieved by a method in a user equipment for handling a scheduling request, SR. The user equipment is served by a base station in a cellular communications network.

The user equipment receives a first message from the base station. The first message comprises a first assignment of SR resources. The first message is received using a first protocol. The first assignment of SR resources is semi-static.

The user equipment further receives a second message from the base station. The second message comprising a second assignment of SR resources. The second message is received using a second protocol. The second protocol is associated with a layer that is lower than a layer associated with the first protocol.

The user equipment then applies the SR resources according to the first assignment and the SR resources according to the second assignment at the same time or separately.

According to a second aspect of embodiments herein, the object is achieved by a method in a base station for handling a scheduling request, SR. The user equipment is served by the base station in a cellular communications network. The base station sends a first message to the user equipment. The first message comprises a first assignment of SR resources. The first message is sent using a first protocol. The first assignment of SR resources is semi-static. The base station further sends a second message to the user equipment. The second message comprises a second assignment of SR resources. The second message is sent using a second protocol. The second protocol is associated with a layer that is lower than a layer associated with the first protocol.

According to a third aspect of embodiments herein, the object is achieved by a user equipment for handling a scheduling request, SR. The user equipment is served by a base station in a cellular communications network. The user equipment comprises a receiving unit configured to receive a first message from the base station. The first message comprises a first assignment of SR resources. The first message is received using a first protocol. The first assignment of SR resources is semi-static. The receiving unit is further configured to receive a second message from the base station. The second message comprises a second assignment of SR resources. The second message is received using a second protocol. The second protocol is associated with a layer that is lower than a layer associated with the first protocol. The user equipment further comprises an applying unit configured to apply the SR resources according to the first assignment and the SR resources according to the second assignment at the same time or separately.

According to a fourth aspect of embodiments herein, the object is achieved by a base station for handling a scheduling request, SR. A user equipment is served by the base station in a cellular communications network. The base station comprises a sending unit configured to send a first message to the user equipment. The first message comprises a first assignment of SR resources. The first message is sent using a first protocol. The first assignment of SR resources is semi-static. The sending unit further is configured to send a second message to the user equipment. The second message comprises a second assignment of SR resources. The second message is sent using a second protocol. The second protocol is associated with a layer that is lower than a layer associated with the first protocol.

Since a second protocol is used for sending and receiving of the second assignment of SR resources, which second protocol is associated with a layer that is lower than a layer associated with the first protocol, and since the lower layer protocol uses less overhead the first protocol, SR periods during active time is provided, giving lower delay and better user perceived throughput with a relatively low PUCCH overhead.

This means that the user equipment has a valid resource more frequently and hence do not have to wait so long to transmit a SR, in average shorter time between triggered SR to SR transmission. With a higher SR frequency, as achieved by embodiments herein, the total delay will be lower since the SR can be sent earlier.

An advantage with embodiments herein is that the overhead is kept low giving better uplink performance and still a low average waiting time for scheduling giving lower latency. The embodiments herein also provide the base station with increased flexibility in assigning resources. This improves the possibility to provide Quality of Service for user equipments served by the base station.

BRIEF DESCRIPTION OF THE DRAWINGS

Examples of embodiments herein are described in more detail with reference to attached drawings in which.

DETAILED DESCRIPTION

Embodiments will be exemplified in the following non-limiting description.

According to some embodiments herein, a base station assigns other SR resources or so called additional SR resources to a user equipment using a more unreliable low layer protocol such as e.g. using Medium Access Control (MAC) control elements. These other SR resources may in some embodiments be Temporary SR, (T-SR) resources, i.e. valid for a limited time. These resources are additional resources or alternative resources to the ones already assigned using a more reliable protocol such as RRC. RRC is as mentioned above protected by both HARQ and RLC retransmission protocols, while MAC only have HARQ. HARQ utilize a single bit acknowledgement (ACK)/not-acknowledgement (NACK) feedback so it has a redundant error probability due to base station misdetection of this feedback bit, i.e. NACK to ACK error. RLC uses a higher layer feedback where also the feedback is protected by HARQ.

Some embodiments herein enables a reliable configuration of resource i.e. letting the user equipment know what resources it may/should use, usable for stable operation and additional less reliable configurations, useful for optimization.

Figure 1:
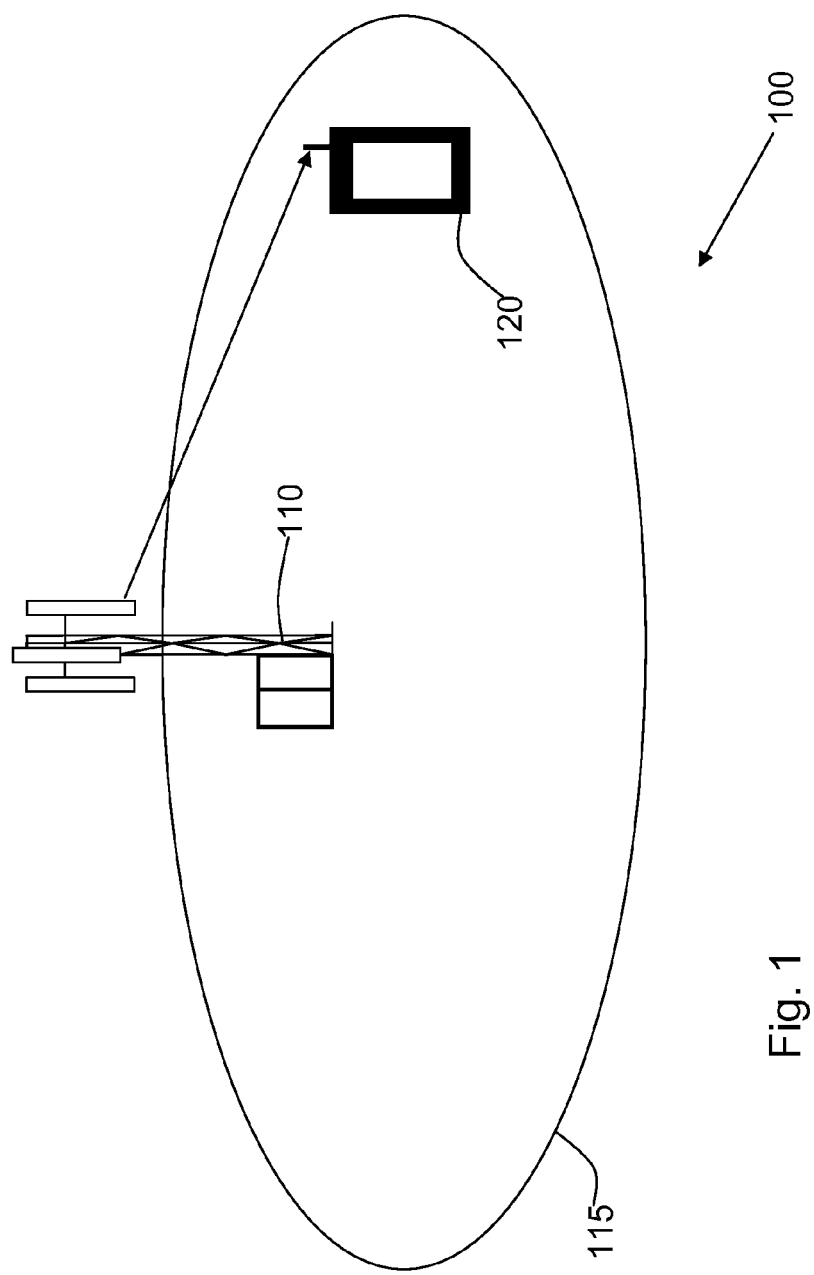
FIG. 1 is a schematic block diagram illustrating embodiments in a cellular communications network.

FIG. 1 depicts a cellular communications network 100 in which embodiments herein may be implemented. The cellular communications system 100 is a wireless communication network such as an LTE, WCDMA, GSM network, any 3GPP cellular network, Wimax, or any cellular network or system.

The cellular communications system 100 comprises a base station 110 which in some figures is referred to as eNodeB 110. The base station 110 is a radio base station serving a cell 115. The base station 110 is a radio network node which in this example e.g. may be an eNB, eNodeB, or a Home Node B, a Home eNode B or any other network unit capable to serve a user equipment or a machine type communication device in a wireless communications system.

A user equipment 120 is located within the cell 115. The user equipment 120 in some figures is referred to as UE 120, and is configured to communicate within the cellular communications network 100 via the base station 110 over a radio link when the user equipment 120 is present in the cell 115 served by the base station 110. The user equipment 120 is a radio network node.

The user equipment 120 may e.g. be a mobile terminal or wireless terminal, a mobile phone, a computer such as e.g. a laptop, Personal Digital Assistant (PDA) or a tablet computer, sometimes referred to as a surf plate, with wireless capability, or any other radio network unit capable to communicate over a radio link in a wireless communications system.

Figure 2:
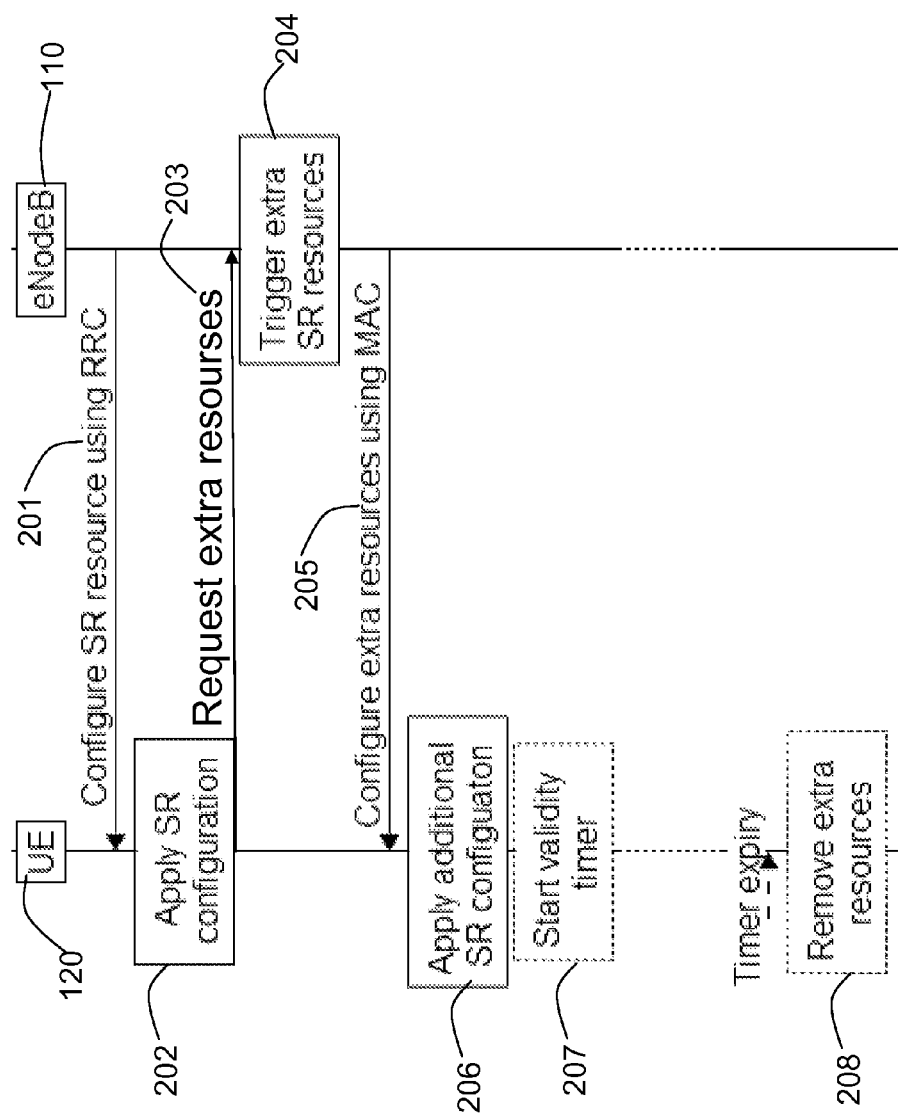
FIG. 2 is a combined signalling scheme and flowchart depicting embodiments of a method.

Embodiments of a method in the user equipment 120 for handling an SR will now be described with reference to a combined signalling diagram and flowchart depicted in FIG. 2, and with reference to a schematic block diagram depicting the user equipment 120 in FIG. 3 and a schematic block diagram depicting the base station 110 in FIG. 4. The user equipment is served by the base station 110 in the cellular communications system 100. The method comprises the following actions, which actions may as well be carried out in another suitable order than described below.

Action 201

The base station 110 sends and the user equipment 120 receives, a message comprising a first assignment of SR resources using a first protocol. An example of the first protocol is RRC. The first assignment of SR resources is semi-static.

This action may be initiated by the base station 110, but in some embodiments, it may be upon a request by the user equipment 120.

For example, this may imply that the base station 110 first assigns, i.e. lets the user equipment 120 know which D-SR resources to use, using e.g. RRC according to legacy system to a user equipment. This may be performed e.g. by including a SchedulingRequestConfig information element (IE) in an RRC message sent to the user equipment 120.

This Action may be performed by a receiving unit 310 in the user equipment 120 and by a sending unit 410 in the base station 110.

Action 202

The user equipment 120 applies the semi-static SR resources according to the first assignment. This Action may be performed by an applying unit 320 in the user equipment 120.

Action 203

In some embodiments the user equipment 120 may send control information in the uplink to the base station 110, such as for example a MAC control element of RRC information element, comprising information such as required SR periodicity or data arrival predictions, requesting other or additional SR resources. The other or additional SR resources are referred to as extra resources in FIG. 2. Why extra resources are requested will be discussed in next Action 204. This may be performed using either RRC or MAC control signalling, or by other means. This Action may be performed by a sending unit 330 in the user equipment 120 and by a receiving unit 430 in the base station 110.

Action 204

According to an example of a scenario, the base station 110 receives information about there being data in the base station 110 buffered for DL transmission to the user equipment or there being data in the user equipment 120 buffered for UL transmission. The information on data buffered in the user equipment 120 may be received over a bursty protocol such as TCP. The term bursty used in this document refers to data is being sent in smaller containers creating an on/off behaviour on a fast time scale during a transaction. Examples on such transactions is the reception of normal SR, BSR or uplink data. The SR, BSR or other information from the user equipment 120 that there is data waiting for UL transmission or information internally in the base station 110 that there are data waiting for DL transmission triggers the base station 110 to assign other or additional SR resources to the user equipment 120, which will be sent to the user equipment 120. The assignment of the other or additional SR resources is sent to the user equipment 120 and is then valid during the entire transaction or during parts of transaction time when a higher data arrival intensity is expected. Expectation this higher arrival intensity periods is based on the burstiness of the protocol. By assigning more frequent SR resources during the burst the total transfer time is lowered. This Action may be performed by a triggering unit 420 in the base station 110.

Action 205

The user equipment 120 receives a message sent from the base station 110. The message comprises a second assignment of SR resources using a second protocol. The second protocol is associated with a layer that is lower than a layer associated with the first protocol. In this way the user equipment 120 is assigned, i.e. notified or made aware of resources it may use. An advantage is that the lower layer of the second protocol uses less overhead than the first protocol.

Layers are a commonly used abstraction method in communication systems. Each layer provides interfaces to higher layers to convey data, often with a pre-stated reliability and delay. Systems may then be built unaware of how the lower layers convey the data only relaying on that they will do so according to the capabilities. Each layer adds its own additional overhead for providing the functionality of the said layer, this implies that overhead of messages sent on a lower layer is less than that sent from a higher, since the higher layer will contain the overhead from the lower layers and its own overhead.

The second protocol may e.g. be the MAC protocol. It may also be physical layer signalling comprising explicit signal structures or messages or bit(s) in messages carried on the physical downlink control channel (PDCCH) known as downlink control information (DCI). This action may e.g. be performed by being configured, also referred to as assigned or signalled, by a MAC control element. A MAC control element is a data-type defined in 3GPP that comprises Radio Resource Management (RRM) information, an example is BSR which is a MAC control element sent from the user equipment 120 to the base station. I.e. the second assignment of SR resources may be sent in a MAC control element specified for that purpose According to some embodiments, the message such as e.g. the MAC control element sent by the base station 110 and received by the user equipment 120, comprises information of activation of the second assignment of SR resources and an indicator of what resource to use. The resource indicator may be a pointer to a predefined set of resources or a pointer indicating among all possible resources.

According to some embodiments, the second assignment of SR resources, such as T-SR, are pre-configured using RRC where only activation and deactivation is signalled or sent with a MAC control element or physical layer signalling.

This Action may be performed by the receiving unit 310 in the user equipment 120 and by the sending unit 410 in the base station 110.

Action 206

In some embodiments the user equipment 120 applies both the SR resources according to the first assignment and the additional SR resources according to the second assignment at the same time.

In other embodiments the user equipment 120 applies the SR resources according to the first assignment and the SR resources according to the second assignment separately. The SR resources according to the second assignment, assigned by the e.g. MAC layer may thus replace the resources assigned by the RRC configuration in these embodiments.

This Action may be performed by the applying unit 320 in the user equipment 120.

Please note that in some embodiments, the actions 203, 204 and/or 205 are performed at the same time or before the actions 201 and/or 202.

Action 207

This is an optional action. According to some embodiments, the SR resources according to the second assignment may be valid for a limited time.

The time may be indicated in the message comprising the second assignment of SR resources, such as e.g. the MAC control element, preconfigured via RRC or specified to a fixed value. The user equipment 120 may then, e.g. start a validity timer for the SR resources according to the second assignment in a subframe for a successful reception of the message such as the MAC control element. This Action may be performed by a time validity control unit 340 in the user equipment 120.

This may be a separate action from the timer and is an optional action: The SR resources according to the second assignment may be tied to only a subset of the original SR or BSR queues. A queue corresponds to one or multiple radio bearers or logical channels aggregated in logical channel groups. Radio bearer, logical channel or Logical Channel Group (LCG) are 3GPP definitions. A radio bearer is a channel and each user may have multiple radio bearers where different data maps to different bearers. The bearers may have different QoS settings. In these embodiments, only BSRs triggered by data in a subset of the configured bearers or logical channel groups, trigger SR on T-SR, and this subset is different than the ones that trigger SR on regular D-SR resources. This has the benefit of allowing better uplink scheduling. This enables the base station 110 to put a second SR resource for high priority data such that the base station 110 in case of congestion can make good scheduling decisions from a Quality Of Service (QoS) point of view.

Action 208

This is an optional action. In some embodiments the SR resources according to the second assignment are removed. This may be performed upon expiry of the timer. This may also be performed by other triggering events such as reception of one or a number of uplink grants on Physical Downlink Control Channel (PDCCH) PDCCH or transmission of the last bits in one or a number of PDCP or RRC PDUs or explicit signalling using MAC or RRC.

As mentioned above the user equipment 120 may apply both the SR resources according to the first assignment and the SR resources according to the second assignment at the same time or separately.

In the embodiments where the SR resources according to the first assignment and the SR resources according to the second assignment are applied separately, there are two options when validity time of the SR resources according to the second assignment expires or are removed either the previous SR resources according to the first assignment are automatically returned to the user or they are not.

This Action may be performed by a time validity control unit 340 and the applying unit 320 in the user equipment 120.

The termination of the SR resources according to the second assignment such as T-SR resources may also be controlled by physical layer control signalling. An example of such a signalling is the reception of an uplink grant on the PDCCH. This would mean that the SR resources according to the second assignment are valid only for the next triggered BSR. This is especially suitable for different handshake protocols where uplink and downlink messages are sent to and fro.

The user equipment 120 may be allowed to have one or multiple SR resources according to the second assignment such as e.g. T-SR resources active simultaneously.

The base station 110 may decide to allocate the SR resources according to the second assignment to the user equipment 120 and decide the validity time fully or partially based on e.g. PUCCH load, downlink data arrival, uplink or downlink buffer size, packet inspection such as e.g. deep or shallow, historic uplink traffic patterns, bearer type or user equipment 120 requests.

A use case for SR resources according to the second assignment is when the user equipment 120 targets services with sporadic packet transaction such as file transfer using Transmission Control Protocol (TCP), for example web surfing. In this use case the user equipment 120 may have an active radio connection to the base station 110 during fairly long time such as for example in order of seconds or minutes or more with sporadic data transaction. The term sporadic referred to in this document means only being active part of the time on a larger time scale, i.e. more due to user interaction for example reading one web page before surfing on to the next.

The TCP protocol is an acknowledged protocol where the sender sends parts of the data and then waits for the receiver to send and acknowledgement (TCP ACK) that data is received before sending more data. For each TCP ACK that is received, more data is sent then what was acknowledged. This gives a "slow start" behavior of TCP where the data rate is increased dependent on the ack-rate. If the user equipment 120 is starting up a TCP download, it is hence important to transmit the TCP ACKs in the uplink as fast as possible during the slow start phase, but it is very hard to predict, even with deep packet inspection exactly when the ACKs will be ready since that is affected by user equipment 120 implementation and processing load. Hence the user equipment 120 will send an SR when the TCP ACK is ready to trigger an uplink grant. By assigning a lower SR periodicity during the slow-start phase, triggered by a starting TCP session the experienced bitrate may be increased by lowering the delay of the TCP ACKs. Lower SR periodicity means more frequent SR resources. At base the line, RRC configured resources are available and at TCP session, extra resources using MAC start is available, hence lower SR periodicity.

With a higher SR frequency, as achieved by embodiments herein, the total delay will be lower since the SR can be sent earlier.

A typical use-case is that the periodicity of SR resources according to the second assignment are lower than that of original configuration but embodiments herein are not limited to that.

Figure 5:
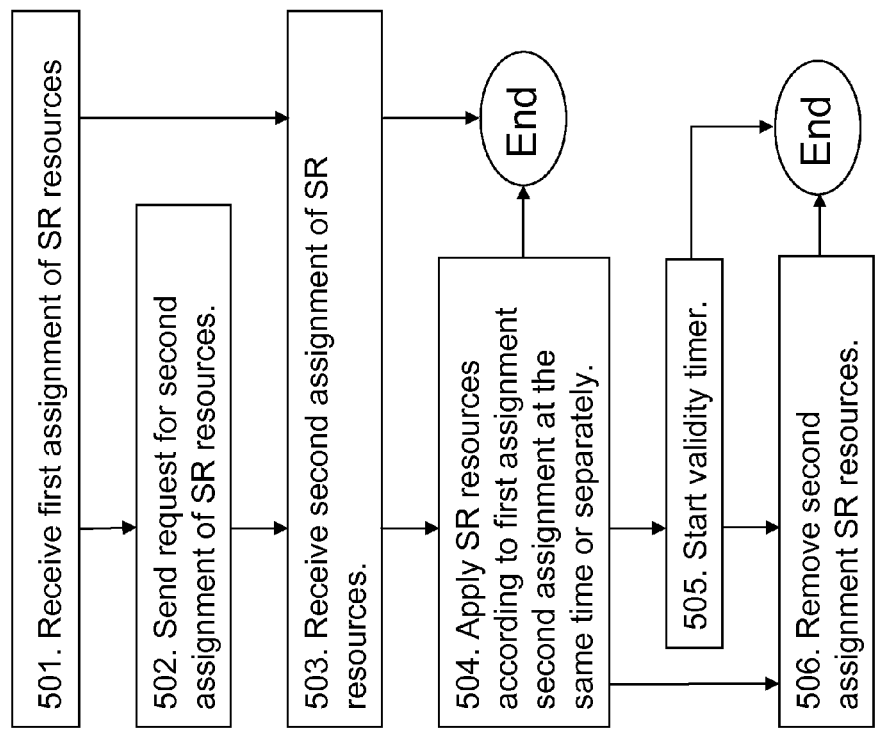
FIG. 5 is a flowchart depicting embodiments of a method in a user equipment.

A method for handling an SR seen in a user equipment 120 perspective will now be described with reference to the flowchart depicted in FIG. 5. As mentioned above the user equipment 120 is served by the base station 110 in the cellular communications network 100.

The method comprises the following actions, which actions may as well be carried out in another suitable order than described below.

Action 501

The user equipment 120 receives a first message from the base station 110. The first message comprises a first assignment of SR resources. The first message is received using a first protocol. The first assignment of SR resources is semi-static.

The first protocol may be the RRC protocol of LTE. The RRC protocol is a third layer protocol that uses HARQ and RLC and is therefore a reliable protocol which uses a certain amount of overhead.

The first assignment of SR resources may be PUCCH Format 1 resources according to LTE.

This action corresponds to action 201 described above.

Action 502

The user equipment 120 may send a request to the base station 110, requesting a second assignment of SR resources and/or the limited time for which the second assignment of SR resources shall be valid and/or the periodicity for the SR allocated in the second assignment. The benefit is that an application in the user equipment 120 may be better at predicting when data will be ready for transmission, and hence there is benefits in letting the base station know this.

This action corresponds to action 203 described above.

Action 503

The user equipment 120 receives a second message from the base station 110. The second message comprises a second assignment of SR resources. The second message is received using a second protocol. The second protocol is associated with a layer that is lower than a layer associated with the first protocol. In some embodiments the second protocol is a MAC protocol of LTE. It may also be physical layer signalling. The MAC protocol is a second layer protocol that uses HARQ but not RLC and is therefore less reliable and uses less overhead.

According to some embodiments, the second message such as e.g. the MAC control element sent by the base station 110 and received by the user equipment 120, comprises information of activation of the second assignment of SR resources and an indicator of what resource to use. The resource indicator may be a pointer to a predefined set of resources or a pointer indicating among all possible resources.

The second message may comprise an indication of time, resource index, and/or periodicity for the second assignment or any subset thereof. The advantage with having the information in the second message is increased scheduler flexibility while pre-configuring parts of the resource assignment may lower the size of the second message giving lower overhead.

The SR resources according to the second assignment may be valid for a limited time. By limiting the valid time of the SR resources according to the second assignment, there is no need to do additional signalling to revoke the resources when they are not needed, misdetection is also less of a problem if the resources are only valid for a limited time. The limited time may be indicated in the second message. In some embodiments, the limited time is specified to a fixed value. The limited time of validity may e.g. be 10, 50 or 100 ms to give some examples.

Also the second assignment of SR resources may be PUCCH Format 1 resources according to LTE.

This action corresponds to action 205 described above.

Action 504

The user equipment 120 then applies the SR resources according to the first assignment and the SR resources according to the second assignment at the same time or separately. By applying both the first and the second assignment at the same time gives robustness to packet loss while still having the benefit of increased SR periodicity. In this case the user equipment 120 may use the resources from the first and the second assignment, but if it misses the second assignment the first assignment is still assumed to be valid in both the user equipment 120 and the base station 110. By applying the configurations separately the overhead on PUCCH may be lower. To handle the risk of the user equipment 120 missing the second assignment, blind decoding may be used in the base station 110 and it is hence not a critical issue.

This action corresponds to action 202 and 206 described above.

Please note that in some embodiments, the actions 503 and/or 504 are performed at the same time or before the actions 501 and/or 502.

Action 505

In the embodiment where the SR resources according to the second assignment are valid for a limited time, the user equipment 120 may start a validity timer related to the limited time. As mentioned above, the limited time may be indicated in the second message received by the user equipment 120. In some embodiments, the validity timer is started in a subframe for a successful reception of a control element of the second protocol. This provides with high probability a common understanding of timer value in the base station 110 and the user equipment 120.

This action corresponds to action 207 described above.

Action 506

The user equipment 120 may remove the second assignment of SR resources, when the limited time has expired.

This action corresponds to action 208 described above.

In some embodiments the SR resources are tied to a subset of assigned radio bearers, logical channels or logical channel groups such that it is only buffer status reports triggered by data in the subset of the configured bearers, logical channels or logical channel groups that trigger SR on the second assignment of SR resources. The subset is different than the ones that trigger SR on the first assignment of SR resources. This provides a scheduler with more granular information of what priority the data available in the user equipment buffer has, and hence enables better quality of service.

Configured radio bearers and logical channels are different terms for the same data flow, which terms are different depending on which protocol and/or protocol layer that is used. Logical channel group is a collection of one or multiple logical channels for with the user equipment 120 reports buffer status jointly. A user equipment may hence have more logical channels/radio bearers than logical channel groups. Configured bearers, logical channels or logical channel groups are different terms for the same thing, which terms are different depending on which protocol and/or protocol layer that is used.

Figure 3:
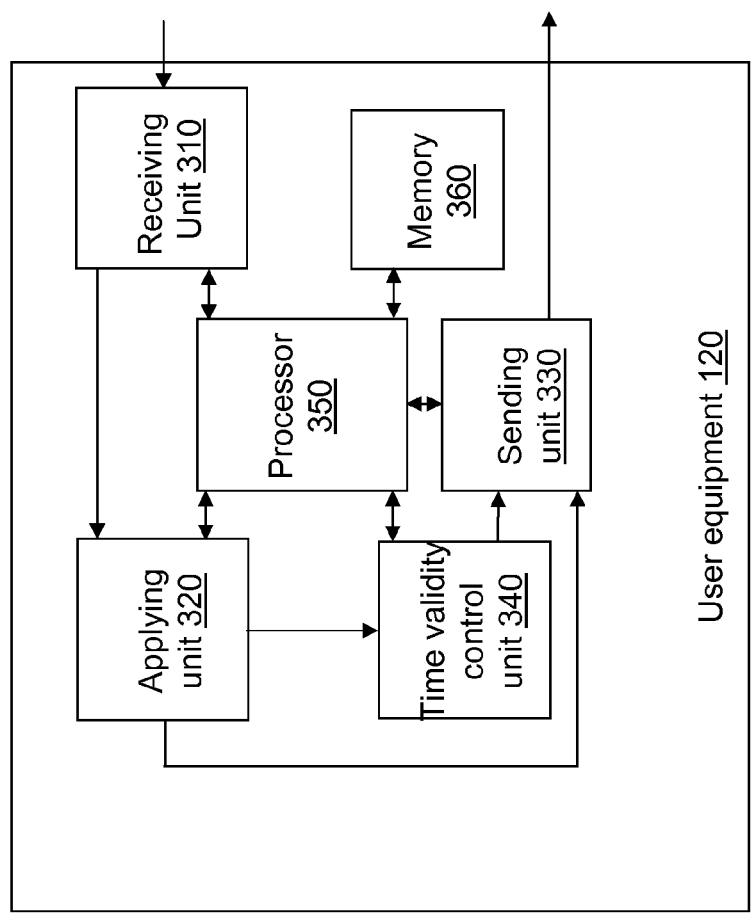
FIG. 3 is a schematic block diagram illustrating embodiments of a user equipment.

To perform the method actions for handling an SR in the user equipment 120 described above in relation to FIG. 2 and FIG. 5, the user equipment 120 comprises the following arrangement depicted in FIG. 3 as hinted above. As mentioned above the user equipment 120 is served by the base station 110 in the cellular communications network 100.

The user equipment 120 comprises the receiving unit 310 configured to receive a first message from the base station 110. The first message comprises a first assignment of SR resources. The first message is received using a first protocol. The first assignment of SR resources is semi-static. The first protocol may be a RRC protocol of LTE.

The receiving unit 310 is further configured to receive a second message from the base station 110. The second message comprises a second assignment of SR resources. The second message is received using a second protocol. The second protocol is associated with a layer that is lower than a layer associated with the first protocol. The second protocol may be a MAC protocol of LTE. It may also be physical layer signalling.

The second message may comprise an indication of time, resource index, and/or periodicity for the second assignment or any subset thereof.

The SR resources according to the second assignment may be valid for a limited time. The limited time may be indicated in the second message. In some embodiments the limited time is specified to a fixed value as mentioned above.

The first assignment of SR resources and the second assignment of SR resources may be PUCCH Format 1 resources according to LTE.

The SR resources may be tied to a subset of assigned radio bearers, logical channels or logical channel groups such that it is only buffer status reports triggered by data in the subset of the configured bearers, logical channels or logical channel groups that trigger SR on the second assignment of SR resources. The subset is different than the ones that trigger SR on the first assignment of SR resources.

The user equipment 120 further comprising the applying unit 320 configured to apply the SR resources according to the first assignment and the SR resources according to the second assignment at the same time or separately.

The user equipment 120 further comprises the sending unit 330 that may be configured to send a request to the base station 110, requesting the second assignment of SR resources and/or the limited time for which the second assignment of SR resources shall be valid and/or the periodicity for the SR allocated in the second assignment and/or the periodicity for which the second assignment of SR resources shall be valid.

In some embodiments the user equipment 120 further comprise the time validity control unit 340 configured to start a validity timer related to the limited time.

The time validity control unit 340 may be configured to start the validity timer in a subframe for a successful reception of a control element of the second protocol.

The time validity control unit 340 may further be configured to remove the second assignment of SR resources, when the limited time has expired.

The embodiments herein for handling a SR may be implemented through one or more processors, such as a processor 350 in the user equipment 120 depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the in the user equipment 120. One such carrier may be in the form of a CD ROM disc. It is however feasible with other data carriers such as a memory stick. The computer program code may furthermore be provided as pure program code on a server and downloaded to the user equipment 120.

The user equipment 120 may further comprise a memory 360 comprising one or more memory units. The memory 360 is arranged to be used to store data, received data streams, indicators of what resource to use, validity time of the time periods, configurations, scheduling, and applications to perform the methods herein when being executed in the user equipment 120.

Those skilled in the art will also appreciate that the receiving unit 310, the applying unit 320, the sending unit 330, and the time validity control unit 340 described above may refer to a combination of analog and digital circuits, and/or one or more processors configured with software and/or firmware (e.g., stored in memory) that, when executed by the one or more processors such as the processor 350, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 6:
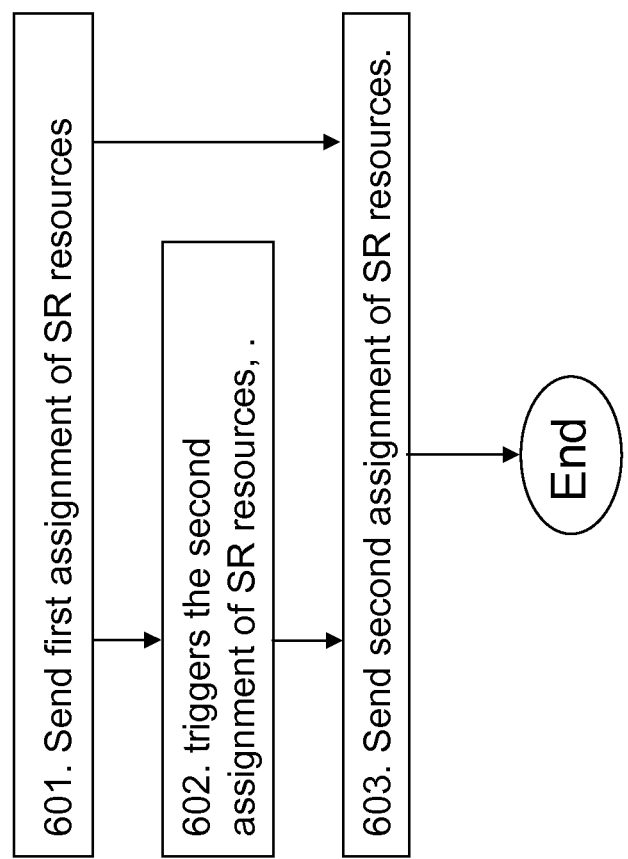
FIG. 6 is a flowchart depicting embodiments of a method in a base station.

A method for handling an SR seen in a base station 120 perspective will now be described with reference to the flow-chart depicted in FIG. 6. As mentioned above, the user equipment 120 is served by the base station 110 in the cellular communications network 100. The method comprises the following actions, which actions may as well be carried out in another suitable order than described below.

Action 601

The base station 110 sends a first message to the user equipment 120. The first message comprises a first assignment of SR resources. The first message is sent using a first protocol. The first assignment of SR resources is semi-static. The first protocol may be the RRC protocol of LTE.

This action corresponds to action 201 described above.

Action 602

In some embodiments, the base station 110 triggers the second assignment of SR resources, based on Physical Uplink Control Channel, PUCCH, load, downlink data arrival, uplink or downlink buffer size, packet inspection, historic uplink traffic patterns, bearer type or upon a request from the user equipment 120.

The SR resources according to the second assignment may be valid for a limited time. The limited time may be specified to a fixed value. In some embodiments, the limited time is configured by RRC, signalling from the base station 110 to the user equipment 120.

In this action of triggering the second assignment of SR resources the base station 110 may further decide the limited time of validity fully or partially based on: PUCCH load, downlink data arrival, uplink or downlink buffer size, packet inspection, historic uplink traffic patterns, bearer type or upon a request from the user equipment 120.

The first assignment of SR resources and the second assignment of SR resources may be PUCCH Format 1 resources according to LTE.

This action corresponds to action 203 described above.

Action 603

The base station 110 sends a second message to the user equipment 120. The second message comprises a second assignment of SR resources. The second message is sent using a second protocol. The second protocol is associated with a layer that is lower than a layer associated with the first protocol. The second protocol may be the MAC protocol of LTE.

The second message may comprise an indication of time, resource index, and/or periodicity for the second assignment or any subset thereof.

The limited time may be indicated in the second message.

This action corresponds to action 205 described above.

Please note that in some embodiments, the actions 602 and/or 603 are performed at the same time or before the action 601.

Figure 4:
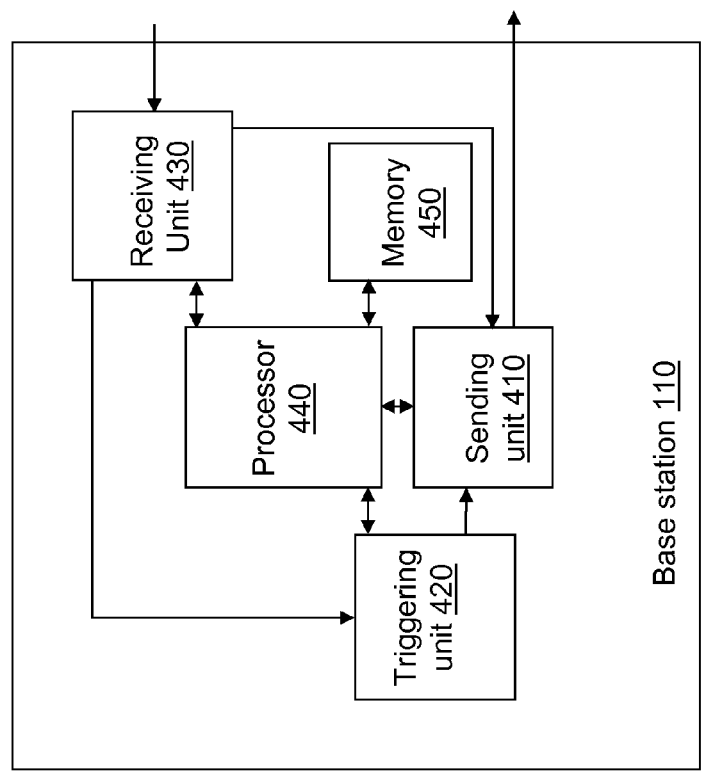
FIG. 4 is a schematic block diagram illustrating embodiments of a base station.

To perform the method actions for handling an SR in the base station 120 described above in relation to FIG. 2 and FIG. 6, the user equipment 120 comprises the following arrangement depicted in FIG. 4. As mentioned above the user equipment 120 is served by the base station 110 in the cellular communications network 100.

The base station 110 comprises the sending unit 410 configured to send a first message to the user equipment 120. The first message comprises a first assignment of SR resources. The first message is sent using a first protocol. The first assignment of SR resources is semi-static. The first protocol may be the RRC protocol of LTE.

The sending unit 410 further is configured to send a second message to the user equipment 120. The second message comprises a second assignment of SR resources. The second message is sent using a second protocol. The second protocol is associated with a layer that is lower than a layer associated with the first protocol. The second protocol may be the MAC protocol of LTE.

The second message may comprise an indication of time, resource index, and/or periodicity for the second assignment or any subset thereof.

The SR resources according to the second assignment may be valid for a limited time. The limited time may be indicated in the second message.

The first assignment of SR resources and the second assignment of SR resources may be PUCCH Format 1 resources according to LTE.

The base station 110 further comprises the triggering unit 420 configured to trigger the second assignment of SR resources, based on Physical Uplink Control Channel, PUCCH, load, downlink data arrival, uplink or downlink buffer size, packet inspection, historic uplink traffic patterns, bearer type or upon a request from the user equipment 120.

The SR resources according to the second assignment may be valid for a limited time.

The triggering unit 420 further may further be configured to decide the limited time of validity fully or partially based on: PUCCH load, downlink data arrival, uplink or downlink buffer size, packet inspection, historic uplink traffic patterns, bearer type or upon a request from the user equipment 120. The request may be received in the receiving unit 430 comprised in the base station 110.

The limited time may be specified to a fixed value. In some embodiments, the limited time is configured by RRC signalling from the base station 110 to the user equipment 120.

The embodiments herein for handling a SR may be implemented through one or more processors, such as a processor 440 in the base station 110 depicted in FIG. 4, together with computer program code for performing the functions and actions of the embodiments herein. The program code mentioned above may also be provided as a computer program product, for instance in the form of a data carrier carrying computer program code for performing the embodiments herein when being loaded into the in the base station 110. One such carrier may be in the form of a CD ROM disc. It is however feasible with other data carriers such as a memory stick. The computer program code may furthermore be provided as pure program code on a server and downloaded to the base station 110.

The base station 110 may further comprise a memory 450 comprising one or more memory units. The memory 450 is arranged to be used to store data, received data streams, indicators of what resource to use, validity time of the time periods, configurations, schedulings, and applications to perform the methods herein when being executed in the base station 110.

Those skilled in the art will also appreciate that the sending unit 410, the triggering unit 420, and the receiving unit 430 described above may refer to a combination of analog and digital circuits, and/or one or more processors configured with software and/or firmware (e.g., stored in memory) that, when executed by the one or more processors such as the processor 440, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Therefore, the above embodiments should not be taken as limiting the scope of the invention, which is defined by the appending claims.

The invention claimed is:

1. A method in a user equipment for handling a scheduling request, SR, the user equipment is served by a base station in a cellular communications network, the method comprising:
   receiving from the base station a first message comprising a first assignment of SR resources, which first message is received using a first protocol, wherein the first assignment of SR resources is semi-static,
   receiving from the base station, a second message comprising a second assignment of SR resources, which second message is received using a second protocol, and wherein the second protocol is associated with a layer that is lower than a layer associated with the first protocol, wherein the SR resources according to the second assignment is valid for a limited time, starting a validity timer related to the limited time wherein the validity timer is started in a subframe for a successful reception of a control element of the second protocol, and applying the SR resources according to the first assignment and the SR resources according to the second assignment at the same time or separately, wherein the SR resources are resources used to transmit and/or receive scheduling request messages.

2. The method according to claim 1, wherein the second protocol is a Medium Access Control, MAC, protocol of Long Term Evolution, LTE.

3. The method according to claim 1, wherein the first protocol is a Radio Resource Control, RRC, protocol of LTE.

4. The method according to claim 1, wherein the second message comprises at least one of an indication of time, resource index, or periodicity for the second assignment.

5. The method according to claim 1, wherein the first assignment of SR resources and the second assignment of SR resources are Physical Uplink Control Channel, PUCCH, Format 1 resources according to LTE.

6. The method according to claim 1, further comprising: removing the second assignment of SR resources, when a limited time has expired.

7. The method according to claim 1, wherein the SR resources are tied to a subset of assigned radio bearers, logical channels or logical channel groups such that it is only buffer status reports triggered by data in the subset of the configured bearers, logical channels or logical channel groups that trigger SR on the second assignment of SR resources, which subset is different than the ones that trigger SR on the first assignment of SR resources.

8. The method according to claim 1, further comprising: sending a request to the base station requesting at least one of the second assignment of SR resources, a limited time for which the second assignment of SR resources shall be valid or a periodicity for the SR allocated in the second assignment.

9. A user equipment for handling a scheduling request, SR, and which user equipment is served by a base station in a cellular communications network, the user equipment comprising:

a receiving unit configured to receive from the base station, a first message comprising a first assignment of SR resources, which first message is received using a first protocol, wherein the first assignment of SR resources is semi-static;

the receiving unit further being configured to receive from the base station, a second message comprising a second assignment of SR resources, which second message is received using a second protocol, and wherein the second protocol is associated with a layer that is lower than a layer associated with the first protocol, wherein the SR resources according to the second assignment is valid for a limited time;

a time validity control unit configured to start a validity timer related to the limited time, wherein the time validity control unit further is configured to start the validity timer in a subframe for a successful reception of a control element of the second protocol; and the user equipment further comprising an applying unit configured to apply the SR resources according to the first assignment and the SR resources according to the second assignment at the same time or separately, wherein the SR resources are resources used to transmit and/or receive scheduling request messages.

10. The user equipment according to claim 9, wherein the second protocol is a Medium Access Control, MAC, protocol of Long Term Evolution, LTE.

11. The user equipment according to claim 9, wherein the first protocol is a Radio Resource Control, RRC, protocol of LTE.

12. The user equipment according to claim 9, wherein the second message comprises at least one of an indication of time, resource index, or periodicity for the second assignment.

13. The user equipment according to claim 9, wherein the first assignment of SR resources and the second assignment of SR resources are Physical Uplink Control Channel, PUCCH, Format 1 resources according to LTE.

14. The user equipment according to claim 9, wherein the time validity control unit further is configured to remove the second assignment of SR resources, when a limited time has expired.

15. The user equipment according to claim 9, wherein the SR resources are tied to a subset of assigned radio bearers, logical channels or logical channel groups such that it is only buffer status reports triggered by data in the subset of the configured bearers, logical channels or logical channel groups that trigger SR on the second assignment of SR resources, which subset is different than the ones that trigger SR on the first assignment of SR resources.

16. The user equipment according to claim 9, further comprising a sending unit configured to send at least one of a request to the base station, requesting the second assignment of SR resources, a limited time for which the second assignment of SR resources shall be valid or a periodicity for the SR allocated in the second assignment.

* * * * *